US00RE34047E

United States Patent [19]

Elrod et al.

[11] E Patent Number: Re. 34,047

[45] Reissued Date of Patent: Sep. 1, 1992

[54] REFRIGERATION SYSTEM

[75] Inventors: Granville P. Elrod, Murfreesboro; John W. Westbrooks, Christiana; Tracy L. McDonald, Winchester, all of Tenn.

[73] Assignee: Standex International Corporation, Salem, N.H.

[21] Appl. No.: 694,224

[22] Filed: Apr. 3, 1991

Related U.S. Patent Documents

Reissue of:

[64] Patent No.: 4,852,365
Issued: Aug. 1, 1989
Appl. No.: 224,500
Filed: Jul. 19, 1988

[51] Int. Cl.[5] ..... F25D 15/00

[52] U.S. Cl. ..... 62/237; 62/250; 62/381

[58] Field of Search ..... 62/237, 281, 238, 297, 62/250, 453

[56] References Cited

U.S. PATENT DOCUMENTS

| | | | |
|---|---|---|---|
| 1,429,435 | 9/1922 | Jones | 62/381 |
| 1,855,817 | 4/1932 | Beauchamp et al. | 62/250 X |
| 2,228,999 | 1/1941 | Birdseye | 62/381 X |
| 2,418,062 | 3/1947 | Abrahamson | 62/250 |
| 2,475,077 | 5/1949 | Clancy | 62/62 |
| 2,601,634 | 6/1952 | Rivette | 62/89 |
| 2,610,473 | 9/1952 | Chovanec | 62/250 |
| 2,677,940 | 5/1954 | Raskin | 62/250 |
| 2,784,567 | 3/1957 | Reynolds | 62/381 |
| 2,811,020 | 10/1957 | Formoso | 62/297 |
| 3,769,805 | 11/1973 | Corini | 62/381 X |
| 3,834,865 | 9/1974 | Lee | 432/241 |
| 4,164,129 | 8/1979 | Stueber | 62/326 |
| 4,285,391 | 8/1981 | Bourner | 165/30 |
| 4,339,928 | 7/1982 | Guibert | 62/237 X |
| 4,344,291 | 8/1982 | Tyree, Jr. et al. | 62/62 |
| 4,356,707 | 11/1982 | Tyree, Jr. et al. | 62/381 |
| 4,663,943 | 5/1987 | Dyment et al. | 62/250 |

*Primary Examiner*—Albert J. Makay
*Assistant Examiner*—William C. Doerrler
*Attorney, Agent, or Firm*—Baker, Maxham, Jester & Meador

[57] ABSTRACT

A refrigeration system comprised of a walled insulated enclosure is provided with a drive motor having a drive shaft extending therefrom. The drive shaft and drive motor are positioned along the ceiling of the walled enclosure. The drive shaft terminates at a coupling mechanism. A complimentary coupling mechanism is attached to the top of a well-known movable food rack. Thus, when the food rack is stored within the walled enclosure, the coupling mechanism on the food rack mates with and attaches to the complimentary coupling mechanism of the drive shaft. When the drive motor is actuated, the drive shaft will rotate the movable food rack. It will be appreciated that by rotating the movable food rack, the present invention will permit the food stored on the food rack to chill far more quickly than if the food rack were to remain stationary. In addition, by rotating the food rack, the present invention eliminates warm air pockets which allow bacterial growth. As a result, the present invention provides less food spoilage relative to prior art refrigeration systems and therefore is more economical to the food service industry user.

17 Claims, 2 Drawing Sheets

REFRIGERATION SYSTEM

Matter enclosed in heavy brackets [ ] appears in the original patent but forms no part of this reissue specification; matter printed in italics indicates the additions made by reissue.

BACKGROUND OF THE INVENTION

This invention relates generally to refrigeration systems used in the food service and related industries. More particularly, this invention relates to a refrigeration system employing means for rotating food racks and the like to obtain quicker chilling of food and to eliminate warm air pockets that allow bacterial growth.

The food industry has long used movable food racks for transporting prepared and unprepared foods to and from refrigerated storage units. These food racks typically comprise a pair of spaced U-shaped supports supported by a base, the base having movable casters thereon. A plurality of guide rails are attached to the spaced U-shaped supports. These guide rails slidably support food trays, pans and similar food containers.

Movable food racks of the type hereinabove discussed are transported to and from refrigeration units which typically comprise a four walled rectangular enclosure which is insulated and which is provided with a refrigeration system for cooling said enclosure. The enclosure includes a doorway and the food racks are stored within the enclosure in a stationary mode.

It will be appreciated that an important deficiency and drawback of known refrigeration enclosures and associated movable food racks is that during storage, the food stored on the food racks will often cool or chill at an undesirably slow rate. In addition, warm air pockets will exist at various places in the food rack. These warm air pockets provide a potential site for bacterial growth which may lead to food spoilage.

SUMMARY OF THE INVENTION

The above discussed and other drawbacks and deficiencies of the prior art are overcome or alleviated by the refrigeration system of the present invention wherein means are employed to rotate a food rack when the food rack is stored within the insulated enclosure of the refrigeration system. In accordance with the present invention, a refrigeration system comprised of a walled insulated enclosure is provided with a drive motor having a drive shaft extending therefrom. The drive shaft and drive motor are positioned along the ceiling of the walled enclosure. The drive shaft terminates at a coupling means. The present invention also includes a complimentary coupling means attached to the top of a well-known movable food rack. Thus, when the food rack is stored within the walled enclosure, the coupling means on the food rack mates with and attaches to the complimentary coupling means of the drive shaft. When the drive motor is actuated, the drive shaft will rotate the movable food rack.

It will be appreciated that by rotating the movable food rack, the present invention will permit the food stored on the food rack to chill far more quickly than if the food rack were to remain stationary. In addition, by rotating the food rack, the present invention eliminates warm air pockets which allow bacterial growth. As a result, the present invention provides less food spoilage relative to prior art refrigeration systems and therefore is more economical to the food service industry user.

The above discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
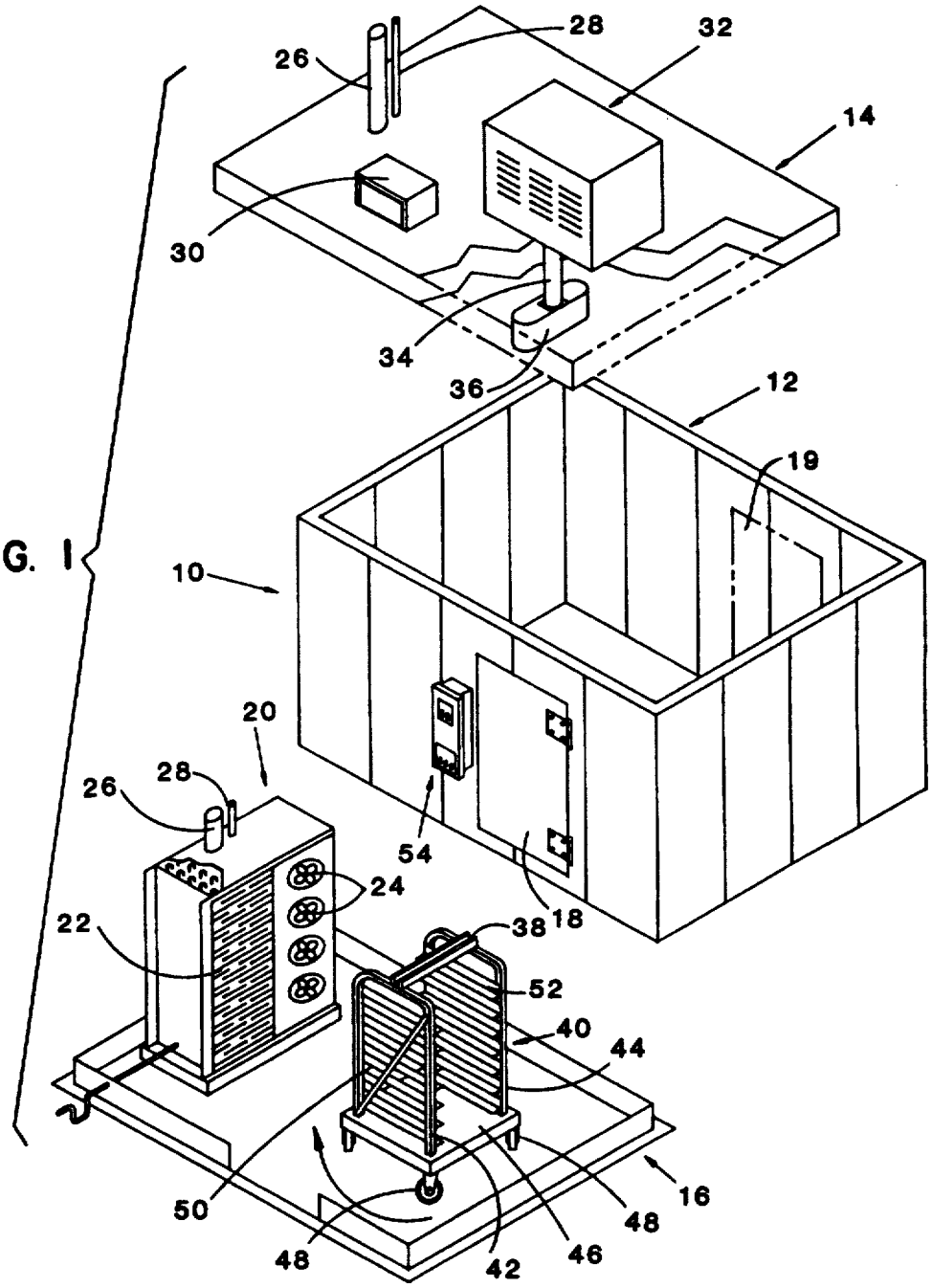
FIG. 1 is an exploded view of a refrigeration system in accordance with the present invention employing means for rotating a food rack.

Referring first to FIG. 1, a refrigeration system in accordance with the present invention is shown generally at 10. Refrigeration system 10 is generally comprised of a walled enclosure 12 provided with a roof or ceiling 14. Enclosure 12 and ceiling 14 is mounted on a base or floor 16.

Enclosure 12 is comprised of any well known insulated material and includes a door 18 which permits exit and entry of movable food racks. An optional door 19 opposes door 18 and allows food racks to pass through the enclosure 12 if required. Enclosure 12 is associated with a known refrigeration system 20. Refrigeration system 20 includes a plurality of refrigeration coils 22 and fans 24 which operate in a known manner to provide chilling or cooling within walled enclosure 12. Refrigerant fluid is moved into and out of refrigeration unit 20 via refrigeration lines 26 and 28. A unit for providing electrical power to refrigeration system 20 is identified at 30 and is mounted on roof 14.

In accordance with the present invention, a drive motor 32 is positioned on roof 14. Drive motor 32 includes a drive shaft 34 positioned through an opening in roof 14. Drive shaft 34 terminates within enclosure 12 at a coupling means 36. It will be appreciated that drive motor 32 rotates drive shaft 34 which in turn will rotate coupling means 36. Coupling means 36 has a generally rectangular configuration and is sized to be received by a mating coupling unit 38 which is attached to a movable food rack shown generally at 40.

Movable food rack 40 has a well known construction and is comprised of a pair of opposed spaced U-shaped supports 42 and 44 which are positioned on a base 46. Base 46 includes four casters 48 attached to the bottom thereof which permit base 46 and rack 40 to be transportable. Support rails 50 and 52 are provided on support brackets 42 and 44, respectively. Support rails 50 and 52 are in facing alignment and are capable of receiving food trays, food containers or food pans and the like which are slidably received thereon in a known manner.

Figure 2:
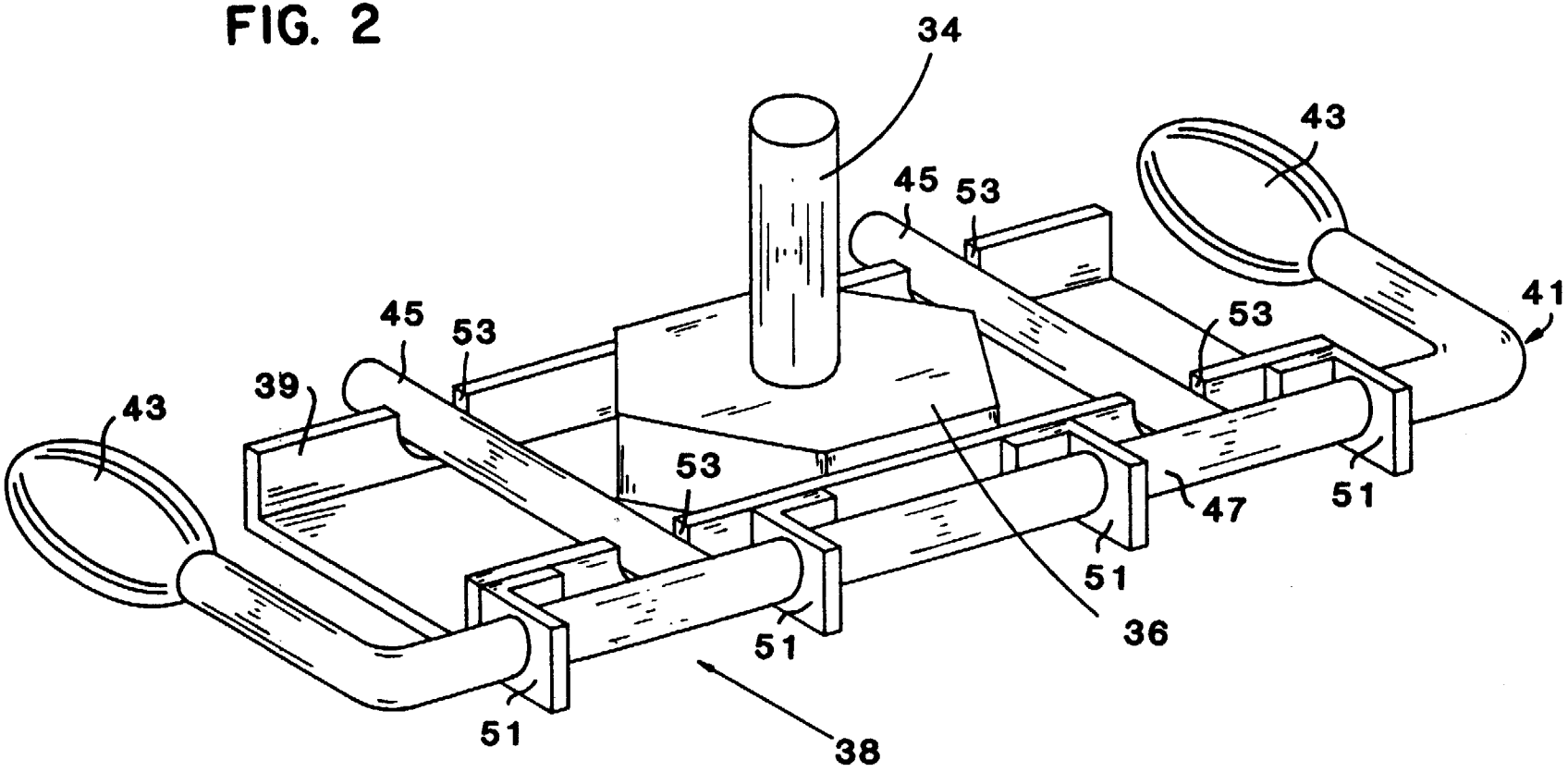
FIG. 2 is a front perspective view showing the complimentary coupling means between the drive motor/-drive shaft and the food rack in accordance with the present invention.

Referring now to FIG. 2, coupling unit 38 is comprised of a U-shaped bracket 39 which is welded or otherwise attached to supports 42 and 44 so that coupling means 38 is transverse to supports 42 and 44. Coupling unit 38 further includes a restraint means 41 which is pivotably attached to U-shaped bracket 39 by L-shaped brackets or mounts [50] *51*. The restraint means 41 is comprised of a handle 43, a main support rod 47 and restraint bars 45 mounted transversely on rod 47. When in use, bars 45 rest in slots [47] *53* cut into the walls of U-shaped bracket 39. When movable food rack 40 enters enclosure 12, restraint means 41 is lifted to allow coupling means 36 to slide into U-shaped bracket 39. When coupling means 36 is positioned between restraining bars 45, restraint means 41 is lowered and coupling means 38 is engaged to the drive coupler 36 as shown in FIG. 2.

During operation, drive shaft 34 is actuated by drive motor 32 and will rotate drive coupler 36 which in turn will rotate coupler 38 so that movable food rack 40 will also rotate on swivelling casters 48. Preferably, means are provided for controlling the speed of rotation. Such controlling means may be provided to a control panel identified at 54 located on the exterior of enclosure 12 near door 18. Preferably, it has been found that the speed *of* rotation of food rack 40 should be between about five rotations per minute (rpm) to one-half rpm; and more preferably the speed of rotation should be about 1 rpm. This rotational speed is intended for a refrigerated enclosure having an air temperature of about −10° F. to about −20° F. and more preferably about −15° F.

The refrigeration system of the present invention employing means for rotating a movable food rack when the food rack is stored within the insulated enclosure of the refrigerated system provides many improvements and advantages over prior art refrigeration systems used in the food service industry. For example, by rotating the food rack, the food is more quickly chilled thereby lessening the chance of food spoilage and markedly improving the overall efficiency of the refrigeration system. Also, by rotation of the movable food rack, warm air pockets which will remain at various points in a food rack when stored in a stationary position within a refrigeration system will be eliminated. It will be appreciated that the elimination of such warm air pockets will preclude bacterial growth and again lessen the chance for food spoilage.

While the present invention has been shown employing a food rack of the type identified at 40, it will be appreciated that the present invention is equally well suited for any other type of food rack so long as the food rack is provided with means which permit rotary movement such as casters or wheels. Thus, for example, a food rack on circular tracks or channels would also be within the scope of the present invention.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A refrigeration system for storing movable food rack means comprising:

an insulated enclosure including an enclosure cover;

rotating means on said enclosure cover for rotating movable food rack means; and at least one movable food rack means in said enclosure, said movable food rack means including rack coupling means for mating with said rotating means, said rack coupling means comprising a U-shaped bracket having restraint means pivotably mounted thereon.

2. The system of claim 1 wherein said rotating means comprises:

drive motor means;

rotatable drive shaft means operatively connected to said drive motor means; and drive coupling means for mating with a movable food rack means.

3. The system of claim 1 wherein said restraint means comprises:

a rod; handle means attached to said rod, *and restraining bar means attached to said rod,* wherein said restraining bar means retains said drive coupling means in said U-shaped bracket.

4. The system of claim 2 wherein:

said drive coupling means comprises a bracket having opposed depending side walls wherein, said side walls are spaced to be received by said U-shaped bracket of said rack coupling means.

5. A refrigeration system comprising:

an insulated enclosure including an enclosure cover;

at least one movable rack means in said enclosure, said movable rack means including rack coupling means comprising a U-shaped bracket having restraint means pivotably mounted thereon; and rotating means on said enclosure cover for rotating said movable rack means, said rotating means including drive coupling means for mating with said rack coupling means.

6. The system of claim 5 wherein said rotating means further includes:

drive motor means; and rotatable drive shaft means operatively connected at a first end to said drive motor means and at a second end to said drive coupling means.

7. The system of claim 5 wherein said restraint means comprises:

a rod; handle means attached to said rod; and restraining bar means attached to said rod, wherein said restraining bar means retains said drive coupling means in said U-shaped bracket.

*8. A refrigeration system comprising:*

*an insulated enclosure having a base, sides and a cover and refrigeration means;*

*closable access means in at least one side of said enclosure;*

*food rack means which is transportable into and out of said enclosure through said access means;*

*means on said food rack means to permit rotation of said food rack means;*

*rotation means mounted to said enclosure; and*

*means for disengageably joining said rotation means to said food rack means when said food rack means is in said enclosure.*

*9. The refrigeration system recited in claim 8, wherein said food rack means is transportable into and out of said enclosure on swivelable casters, said casters also comprising said means to permit rotation of said food rack means.*

*10. The refrigeration system recited in claim 8, wherein said means for disengageably joining comprises a drive coupling coupled to said rotation means and a mating rack coupling mounted to said food rack means.*

*11. The refrigeration system recited in claim 8, wherein said rotation means is configured to rotate said food rack means at an angular rotation velocity of between 0.5 and 5 revolutions per minute.*

*12. The refrigeration system recited in claim 11, wherein said rotation means rotates said food rack means at one revolution per minute.*

*13. The refrigeration system recited in claim 11, wherein said refrigeration means generally maintains the tempera-*

*ture with said enclosure at between about −10° F. and −20° F.*

*14. The refrigeration system recited in claim 13, wherein said refrigeration means maintains the temperature within said enclosure at about −15° F.*

*15. The refrigeration system recited in claim 8, wherein said rotation means comprises a drive motor having a drive shaft.*

*16. The refrigeration system recited in claim 15, wherein said means for disengageably joining comprises a drive coupling on said drive shaft and mating rack coupling means on said food rack means.*

*17. The refrigeration system recited in claim 8, wherein said enclosure comprises a plurality of rotation means and is shaped and configured to accommodate a like plurality of food rack means adapted to selectively be joined with one of said rotation means.*

* * * * *

UNITED STATES PATENT AND TRADEMARK OFFICE

CERTIFICATE OF CORRECTION

PATENT NO. : RE34047

DATED : 1 September 1992

INVENTOR(S) : Granville P. Elrod, et al.

It is certified that error appears in the above-identified patent and that said Letters Patent is hereby corrected as shown below:

Claim 13, column 5, line 1, change "with" to --within--.

Signed and Sealed this

Thirty-first Day of August, 1993

Bruce Lehman

*Attest:*

BRUCE LEHMAN

*Attesting Officer*

*Commissioner of Patents and Trademarks*